United States Patent Office 3,285,944
Patented Nov. 15, 1966

3,285,944
MANUFACTURE OF ORGANO-TIN COMPOUNDS
Vincent Oakes, Eccleston, near St. Helens, England, assignor to Pure Chemicals Limited, Liverpool, England, a British company
No Drawing. Filed Apr. 2, 1963, Ser. No. 269,866
Claims priority, application Great Britain, Apr. 9, 1962, 13,529/62; Oct. 15, 1962, 38,866/62
4 Claims. (Cl. 260—429.7)

This invention relates to the production of organo-tin compounds containing tin-sulphur linkages, which compounds are known as thiotins.

Such compounds are very useful as stabilisers for vinyl resins, but have a powerful odor due to the presence of small residual quantities of the mercaptans which are used as starting materials in the manufacture of the thiotin compounds. Such residual traces of mercaptans are difficult to remove economically on a commercial scale.

It is an object of the invention to provide a method of preparing thiotins which does not involve the use of mercaptans or substances containing or giving rise to mercaptans, and which substantially eliminates the odor of the resulting product.

According to the invention, thiotins are made by reacting an alkyl tin oxide with an iso-thiouronium salt.

The iso-thiouronium salts can readily be prepared, and as the sulphur is present as a thioether linkage, they are virtually odorless. No free mercaptan groups are formed during the reaction and the products are virtually odorless. The reaction may be brought about by heating equivalent amounts of the starting materials in a suitable solvent.

By reacting a dialkyltin oxide with an iso-thiouronium salt of the structure

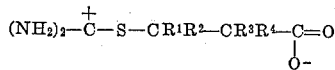

where R¹, R², R³ and R⁴ are hydrocarbon radicals, or hydrogen atoms, there are obtained dialkyltin B-mercaptide compounds, which are very effective stabilisers for vinyl resins.

The reaction appears to be of a general nature and all isothiouronium salts which are capable of preparation appear to enter readily into reaction with dialkyl tin oxides to afford effective stabilisers of vinyl resins. Examples of isothiouronium salts which have been used in this reaction but in no way should be taken as limiting the scope of the invention are as shown:

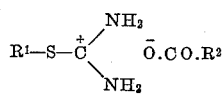

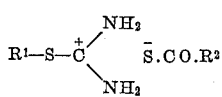

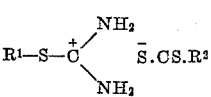

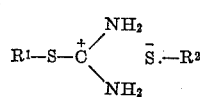

It is also possible to carry out the reaction under milder conditions and to stop it at an intermediate stage resulting in the formation of a product of the type:

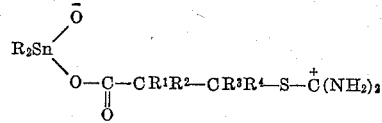

This product is converted by heating into a dialkyltin B-mercaptide compound. It is an effective stabiliser for vinyl resins.

It has further been found that an intimate physical mixture of a dialkyltin oxide and an isothiouronium salt as described above is an effective stabiliser for vinyl resin, although the separate constituents have virtually no stabilising effect. This may be due to the formation of a dialkyltin mercaptide in situ.

The invention is illustrated by the following examples:

*Example 1.—Preparation of S-benzyl isothiouronium chloride*

The example given here is typical of methods which can be used for the preparation of S-benzyl isothiouronium halides. In the example given, benzyl chloride, has been used as the reacting halide and thus S-benzyl isothiouronium chloride has been formed. However, the benzyl chloride can be replaced by any other alkyl or aralkyl halide to form the corresponding isothiouronium salt.

7.6 gms. of thiourea (0.1 mol) and 12.65 of benzyl chloride (0.1 mol) were mixed in 113 gms. of alcohol and refluxed for 2 hours. The resulting mixture was a 15% solution weight for weight of S-benzyl isothiouronium chloride.

*Example 2.—Preparation of S-benzyl isothiouronium thiobenzoate*

This example is typical of methods which can be used for the prepartion of any alkyl or aralkyl thiouronium carboxylates or thiocarboxylates from the corresponding isothiouronium halides. In this example benzoic acid has been used as the reacting carboxylic acid but this can be replaced by any other carboxylic or thiocarboxylic acid on an equimolar basis.

12.2 gms. of benzoic acid (0.1 mol) were mixed with 4.0 gms. of caustic soda (0.1 mol) in 100 mls. of water until a solution had formed. This solution was filtered and to the stirred filtrate was added 135 gms. of 15% S-benzyl isothiouronium chloride solution in alcohol. The precipitate was formed immediately which after filtration, washing with alcohol and drying proved to be S-benzyl isothiouronium benzoate.

*Example 3.—Reaction between DBTO and S-benzyl isothiouronium benzoate*

28.8 gms. of S-benzyl isothiouronium benzoate and 25.0 gms. of DBTO were refluxed with stirring in toluene for six hours. After this period the mixture was cooled and filtered and the filtrate stripped of solvent to yield dibutyl tin benzyl mercaptide benzoate as a pale yellow oil which showed a tendency towards crystallisation at room temperature.

*Example 4.—Reaction between DBTO and S-benzyl isothiouronium thiobenzoate*

30.8 gms. of S-benzyl isothiouronium thiobenzoate and 25.0 gms. of dibutyl tin oxide were refluxed together in toluene in an apparatus which allowed the ammonia formed to escape. The mixture was refluxed for six hours after which time it was filtered and the filtrate stripped of solvent to yield dibutyl tin thiobenzoate benzyl mercaptide as a yellow oil.

*Example 5.—Reaction between DBTO and S-benzyl isothiouronium laurate*

35.4 gms. of S-benzyl isothiouronium laurate and 25.0 gms. of dibutyl tin oxide were reacted for six hours. The mixture was then cooled and filtered and the filtrate stripped of solvent to yield dibutyl tin laurate benzyl mercaptide as a yellow oil.

*Example 6.—Reaction between S-benzyl isothiouronium cinnamate and DBTO*

In a similar manner to the preceding examples, 31.4 gms. (0.1 mol) of S-benzyl isothiouronium cinnamate was reacted with DBTO and dibutyl tin cinnamate benzyl mercaptide was obtained as a yellow oil which set to a soft solid on standing.

*Example 7—Preparation of S-cetyl isothiouronium bromide*

7.6 gms. of thiourea (0.1 mol) and 30.5 gms. of cetyl bromide (0.1 mol) were mixed in 215 gms. of alcohol and refluxed for 3 hours. The resulting mixture was a 15% solution w./w. of S-cetylisothiouronium bromide.

*Example 8.—Preparation of S-cetyl isothiouronium benzoate*

12.2 gms. of benzoic acid (0.1 mol) were mixed with 4.0 gms. of NaOH (0.1 mol) and 100 ml. water and the solution filtered. To the stirred filtrate was added 260 gms. of a 15% solution of S-cetyl isothiouronium bromide in alcohol. The resulting precipitate was filtered off, washed and dried and proved to be S-cetyl isothiouronium benzoate.

*Example 9.—Reaction between S-cetyl isothiouronium laurate and DBTO*

15.0 gms. of S-cetyl isothiouronium laurate and 25.0 gms. of DBTO were refluxed with stirring in toluene for six hours. The mixture was then filtered and the filtrate stripped under reduced pressure to yield dibutyl tin laurate cetyl mercaptide.

*Example 10.—Reaction between DBTO and S-cetyl isothiouronium benzoate*

41.8 gms. of S-cetyl isothiouronium benzoate and 25.0 gms. of DBTO were reacted together in toluene for ten hours. The resulting mixture was filtered and the toluene removed under reduced pressure to yield dibutyl tin benzoate cetyl mercaptide as a cloudy yellow liquid.

*Example 11.—Reaction between DBTO and S-cetyl isothiouronium cinnamate*

44.8 gms. of S-cetyl isothiouronium cinnamate and 25.0 gms. of DBTO were reacted as above for six hours. After this time the reaction mixture was filtered and the toluene removed under reduced pressure to yield dibutyl tin cinnamate cetyl mercaptide as a cloudy viscous liquid.

*Example 12*

Dibutyl tin oxide (1 mol) and the isothiouronium salt (1 mol) obtained by reacting B-propiolactone with thiourea were refluxed together with toluene for six hours. After this period the reaction mixture was filtered and the toluene removed under reduced pressure to afford dibutyl tin B-mercapto propionate as a yellow liquid which solidified on cooling. This product could be crystallised from alcohol to afford a white crystalline material analysing for dibutyltin B-mercapto propionate.

*Example 13*

Dibutyl tin oxide (1 mol) and the isothiouronium salt as used in Example 12 (2 mols) were refluxed together in toluene. After working up the reaction mixture as in Example 12 it was shown that the reaction had taken the same course and the only identifiable product was dibutyltin B-mercapto propionate.

*Example 14*

The thiouronium salt (1 mol) of Example 12 was dissolved in water at 55° C. and dibutyl tin oxide (1 mol) added. Vigorous stirring resulted in an extremely fine suspension being formed. The mixture was cooled to 15° C. and filtered to afford the intermediate described in Formula I contaminated by some of the starting material together with small amounts of dibutyl tin B-mercapto propionate.

*Example 15*

Dioctyl tin oxide (1 mol) and the isothiouronium salt of Example 12 were heated in toluene for several hours. Filtration followed by removal of the toluene afforded a yellow gum which analysed for dioctyl tin B-mercapto propionate.

*Example 16.—Reaction of DBTO with S-octyl isothiouronium benzoate*

S-octyl isothiouronium benzoate 23.5 gms. and DBTO 18 gms. were refluxed together in toluene for six hours. After this period the solution was filtered and the toluene removed under reduced pressure to leave dibutyl tin benzoate octyl mercaptide as a yellow oil.

*Example 17.—Reaction between DBTO and S-octyl isothiouronium acrylate*

S-octyl isothiouronium acrylate 20 gms. and DBTO 19.4 gms. were refluxed together in toluene for six hours. The resulting mixture was then filtered and the toluene removed under reduced pressure, to yield dibutyl tin acrylate octyl mercaptide as a pale yellow oil.

*Example 18.—Reaction between DBTO and S-octyl isothiouronium mono octyl maleate*

S-octyl isothiouronium mono octyl maleate 40 gms. and DBTO 24 gms. were reacted in toluene as in the preceding examples. After filtration and removal of the toluene dibutyl tin octyl maleate octyl mercaptide was obtained as a yellow oil.

*Example 19.—Reaction between dioctyl tin oxide and S-octyl isothiouronium thiobenzoate*

S-octyl isothiouronium thiobenzoate (1 mol) and dioctyl tin oxide (1 mol) were reacted together in toluene for six hours. The resulting mixture was then filtered and the toluene removed under reduced pressure to afford dioctyl tin thiobenzoate octyl mercaptide as a viscous yellow oil.

*Example 20.—Reaction between dioctyl tin oxide and S-octyl isothiouronium cinnamate*

S-octyl isothiouronium cinnamate (1 mol) and dioctyl tin oxide (1 mol) were reacted as in Example 17. After working up in the usual manner dioctyl tin octyl mercaptide cinnamate was obtained as a yellow oil.

*Example 21.—Reaction between dioctyl tin oxide and S-octyl isothiouronium octoate*

By using 1 mol of S-octyl isothiouronium octoate under the conditions of reaction described in Example 17, dioctyl tin octyl mercaptide octoate could be isolated as a yellow oil.

*Example 22.—Reaction of DBTO and S-octyl isothiouronium lauryl mercaptide*

S-octyl isothiouronium lauryl mercaptide (1 mol.) is dissolved in toluene (500 mls.) and charged into a vessel which is connected for azeotropic distillation. 25 gms. of DBTO is then added and the mixture refluxed with stirring until all the water has been evolved. The product is then cooled and filtered and the filtrate stripped under reduced pressure to yield dibutyl tin lauryl mercaptide octyl mercaptide as a yellow oil.

Example 23

The products from Examples 3–6 and 9–22, together with equimolar mixtures of the isothiouronium salts used in these examples with dibutyl tin oxide and dioctyl tin oxide, were tested as stabilisers for P.V.C. as follows:—

The dibutyl tin salts or a mixture of the isothiouronium salts plus dialkyl tin oxide were incorporated at 2.0 phr. into a plasticised P.V.C. formulation consisting of Corvic D65/6 or Breon III 100 parts plus dioctyl phthalate 50 parts. The resultant hides were sheeted at 50 thousandths of an inch and heated in an air circulating oven at 175° C. for 120 minutes.

In all instances virtually no discolouration was noted at the end of this heating period, whereas a control experiment using dibutyl tin dilaurate discolored after 60 minutes.

What is claimed is:

1. A method of preparing organo-tin compounds containing tin-sulphur linkages, comprising reacting an alkyl tin oxide with an isothiouronium salt.

2. A method as claimed in claim 1, in which a dialkyltin oxide is reacted with an isothiouronium salt of the structure

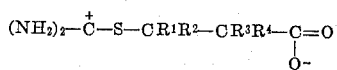

where $R^1$, $R^2$, $R^3$ and $R^4$ are selected from the group consisting of hydrocarbon radicals and hydrogen atoms for a period sufficient to produce a dialkyltin B-mercaptide carboxylate compound is obtained.

3. A method as claimed in claim 1, in which a dialkyltin oxide is reacted with an isothiouronium salt having a formula selected from the group consisting of

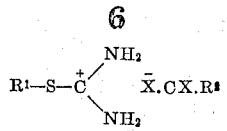

and

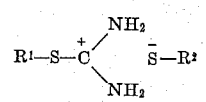

where $R^1$ and $R^2$ are hydrocarbon radicals and X is selected from the group consisting of oxygen and sulphur.

4. A method as claimed in claim 2, in which the reaction is stopped at an intermediate stage to give a product having the formula:

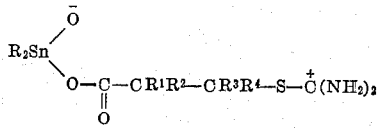

References Cited by the Examiner

UNITED STATES PATENTS

| | | | |
|---|---|---|---|
| 2,870,119 | 1/1959 | Leistner et al. | 260—45.75 |
| 2,870,182 | 1/1959 | Leistner et al. | 260—429.7 |
| 2,914,506 | 11/1959 | Mack et al. | 260—45.75 |
| 3,027,350 | 3/1962 | Mack et al. | 260—45.75 |
| 3,126,400 | 3/1964 | Cramer et al. | 260—429.7 |

TOBIAS E. LEVOW, *Primary Examiner.*

LEON J. BERCOVITZ, *Examiner.*

G. W. RAUCHFUSS, Jr., W. F. W. BELLAMY,
*Assistant Examiners.*